United States Patent [19]

Chimura et al.

[11] 3,988,387
[45] Oct. 26, 1976

[54] POLYESTER FIBERS HAVING EXCELLENT DYEABILITY

[75] Inventors: Kazuya Chimura; Hiroshi Iwata, both of Ohtake; Takashi Kaneko, Tokyo; Ryuichi Nakazono, Ohtake, all of Japan

[73] Assignee: Mitsubishi Rayon Co., Ltd., Tokyo, Japan

[22] Filed: Oct. 11, 1974

[21] Appl. No.: 514,132

Related U.S. Application Data

[63] Continuation-in-part of Ser. No. 449,338, March 8, 1974, abandoned.

[52] U.S. Cl. ............................ 260/860; 8/165; 8/179; 8/DIG. 4; 260/45.7 P; 260/45.7 S; 260/45.8 R; 260/45.9 NC; 260/45.95 C
[51] Int. Cl.² ........................................ C08L 67/02
[58] Field of Search ................................ 260/860

[56] References Cited
UNITED STATES PATENTS

| | | | |
|---|---|---|---|
| 2,623,031 | 12/1952 | Snyder | 260/860 |
| 3,265,762 | 8/1966 | Quisenberry | 260/860 |
| 3,560,591 | 2/1971 | Tvanaka | 260/860 |
| 3,629,366 | 12/1971 | Brinkmann | 260/860 |
| 3,651,172 | 3/1972 | Barkey | 260/860 |

FOREIGN PATENTS OR APPLICATIONS

| | | | |
|---|---|---|---|
| 132,546 | 5/1949 | Australia | 260/860 |
| 1,386,153 | 12/1964 | France | 260/860 |

*Primary Examiner*—Murray Tillman
*Assistant Examiner*—W. C. Danison, Jr.
*Attorney, Agent, or Firm*—Oblon, Fisher, Spivak, McClelland & Maier

[57] ABSTRACT

Polyester fibers which are characterized by excellent dyeability are produced by spinning a polymer obtained by an ester interchange reaction of 60 to 95% by weight of a polyester, containing at least 95 mol % of ethylene terephthalate units, and 40 to 5% by weight of a polyester containing at least 85 mol % of tetramethylene terephthalate units, wherein the filamentary polymer has a melting point Tm (° C) of $Tm_o - 5(°C) \geq Tm \leq Tm_o - 20(°C)$ (wherein $Tm_o$ is the melting point of the polyester containing at least 95 mol % of ethylene terephthalate unit) and a crystallizing temperature of 170° C or higher.

5 Claims, No Drawings

POLYESTER FIBERS HAVING EXCELLENT DYEABILITY

CROSS REFERENCE TO RELATED APPLICATIONS

This application is a continuation-in-part of application Ser. No. 449,338, filed Mar. 8, 1974 now abandoned.

BACKGROUND OF THE INVENTION

1. Field of the Invention

The present invention relates to polyester fibers which are characterized by improved dyeability, and more particularly it relates to novel polyester fibers having a combination of high dyeability with the excellent fiber properties normally possessed by polyethylene terephthalate fibers and to a method for producing the same.

2. Description of the Prior Art

Polyethylene terephthalate fibers have been widely used for various purposes because of their excellent properties, but they have one significant defect in that they are inferior to other fibers in terms of dyeability, which has limited their use for producing cloth materials.

Various methods have been attempted to improve the dyeability of polyethylene terephthalate fibers, e.g., copolymerization, addition of various easily dyeable high molecular weight or low molecular weight materials, physical modification during the production of the fiber step, etc. However, these methods often damage the otherwise excellent mechanical and heat resistant properties of polyethylene terephthalate fibers, and make stable production thereof difficult. They result in increased costs of production which are not offset by the improvements in dyeability. Thus, industrially acceptable methods have not yet been established. Therefore, currently, dyeing of polyethylene terephthalate fibers have been carried out mainly by high pressure dyeing or carrier-dyeing methods.

A need exists therefor, for polyester fibers which are characterized by high dyeability, yet which retain the excellent properties of polyethylene terephthalate fibers.

SUMMARY OF THE INVENTION

According to the present invention, polyester fibers which are characterized by excellent dyeability and excellent fiber properties are formed by use of a polymer having a melting point (Tm ° C) of $Tm_o-5°\ C \geq Tm \geq Tm_o-20°\ C$ (wherein $Tm_o$ means melting point of a polyester containing 95 mol % of ethylene terephthalate unit) and a crystallizing temperature of at least 170° C, which is obtained by melt mixing 60 to 95% by weight of a polyester which is predominately composed of polyethylene terephthalate (said polyester is referred to as PET hereinafter) and 5 to 40% by weight of a polyester which is predominately composed of polytetramethylene terephthalate (said polyester is referred to as PTMT hereinafter) which results in an ester interchange reaction between the two polyesters.

DETAILED DESCRIPTION OF THE PREFERRED EMBODIMENTS

The most important technical point of the present invention is that PTMT and PET are melt mixed so that they are formed into a filamentary polymer having certain suitable characteristic values, from which fibers are produced.

PTMT fibers are characterized by a higher dyeability compared to PET fibers. However, PTMT fibers have a melting point of about 225° C, so that it must be considered as having low heat resistance. PTMT fibers therefore cannot be finished in the same manner as usual polyester fibers. Moreover, the initial tensile elasticity (Young's modulus) of PTMT fibers is as low as that of polyamide fibers, and hence PTMT fibers do not possess a tenacious hand, which is the greatest characteristic of conventional polyester fiber articles.

It has now been found, according to the present invention, that fibers can be formed which will have the excellent properties of PET fibers, and yet maintain the high dyeability of PTMT fibers. This result can be attained by reacting not more than 40% by weight, preferably not more than 35% by weight, of PTMT, and at least 60% by weight, preferably at least 65% by weight of PET by melt mixing the two esters so as to effect ester interchange therebetween. The fibers obtained in this manner surprisingly will maintain the excellent properties of each ester, and simultaneously will have a dyeability which is close to that of fibers which are mostly composed of PTMT. This surprising effect cannot be expected from a simple mixture of PET and PTMT.

The high compatibility of PTMT with PET seems to account for the stable and homogeneous melt mixing and retention of excellent fiber properties. Furthermore, the unexpectedly high dyeability which is attained by this invention is greatly attributable to the acceptable ester interchange reaction between the PET and the PTMT at the melt mixing step. This invention is quite surprising, especially since it was previously believed that if a second component is added to PET fibers in an attempt to improve dyeability, the diffusion velocity of the dye stuff would be adversely effected. However, according to the present invention, such a drawback is not caused and a highly dyeable fiber can be obtained. In the present invention, PET and PTMT are melt mixed and spun into a fiber. The mixing ratio and condition of treatment must be such that melting point and crystallizing temperature of filamentary polymer, namely, the strand just extruded from the spinneret before winding (i.e., out-put strand or undrawn filament) will satisfy the following formulae:

$$Tm_o-5°\ C \geq Tm \geq Tm_o-20°\ C \quad \ldots \quad 1.$$

$$Tc \geq 170°\ C \ldots \quad 2.$$

(wherein Tm and $Tm_o$ are the same as defined before and Tc is a crystallizing temperature of filamentary polymer).

More preferably $$Tm_o-5°\ C \geq Tm \geq Tm_o-20°\ C$$

$$Tc \geq 175°\ C$$

(wherein Tm, $Tm_o$ and Tc are the same as defined before).

Under these conditions, the product fibers will emulate PET fibers in terms of thermal and mechanical properties, such as heat resistance, heat settability, Young's modulus, etc., yet will be characterized by markedly improved dyeability.

The melting point and the crystallizing temperature of the filamentary polymer will depend greatly upon the formation of a block-copolymer and a shortening of the repeating units by partial ester interchange reaction between PET and PTMT:

When Tm of the filamentary polymer obtained by melt-mixing and subsequent spinning exceeds $Tm_o-5°$ C, the formation of the block copolymer caused by the ester interchange reaction will proceed quite rapidly and the synergistic improvement in dyeability will not be obtained. On the other hand, when Tm is lower than $Tm_o-20°$ C, the block copolymer units are unacceptably shortened. This results in a diminishing of the thermal and mechanical properties of the fibers, and in particular to heat resistance, heat settability of crimps, dimension stability, Young's modulus, etc. The resultant fibers are thus similar to or inferior to an ordinary copolymer type polyester fiber.

The crystallizing temperature Tc is a characteristic value which is, in a sense, also considered a standard for crystallizing speed. Usually, the crystallizing temperature of the substrate PET, which is 205° – 210° C as the ester interchange reaction between the PET and the PTMT progresses. As the Tc decreases to below 170° C, the heat resistance of the fibers is extremely decreased and correlatively Young's modulus is also markedly decreased. As a result, the tenaceous hand peculiar to PET fiber articles is lost.

These characteristics can be controlled either by controlling the mixing ratio of PTMT, or by controlling the temperature at the melt, mixing and spinning steps or retention time at molten state. In order to attain improved dyeability, the PTMT must be mixed in an amount of at least 5% by weight, preferably at least 10% by weight. On the other hand, to assure stability in fiber production and to ensure the optimum fiber properties, the mixing proportion of PTMT should be less than 40% by weight, preferably 35% by weight. When the content of the other component in PET or PTMT is high, the mixing proportion should be further decreased.

The PTMT polymer used in the present invention is preferably composed of 100 mol % of tetramethylene terephthalate units. Alternatively, the PTMT component may contain up to 15 mol % of another component, such as the lower alcohols, such as ethylene glycol, triethylene glycol, 1,4-cyclohexane dimethanol, glycerine, pentaerythritol, etc.; polyether glycols, such as polyethylene ether glycol, polypropylene ether glycol, polytetramethylene ether glycol; and dicarboxylic acids, such as isophthalic acid, 1,4- or 1,5- or 2,6-naphthalic acid, sebacic acid, adipic acid, etc.

The PET polymer used in the present invention is preferably composed of at least 95 mol % of ethylene terephthalate units. Another component to be copolymerized with PET can be, for instance, lower alcohols, such as triethylene glycol, tetramethylene glycol, cyclohexane, dimethanol, glycerine, pentaerythritol, etc.; polyether glycols such as polyethylene ether glycol, polypropylene ether glycol, polytetramethylene ether glycol, etc; and dicarboxylic acids, such as isophthalic acid, 1,4- or 1,5- or 2,6-naphthalic acid, sebacic acid, adipic acid, etc.

The dicarboxylic acid component may be a sulfonate of the formula:

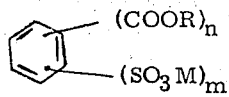

(wherein R is hydrogen, a lower alkyl or a hydroxyalkyl, M is an alkali metal, m is 1 or 2 and n is 1, 2 or 3) which may be copolymerized with PET to impart especially superior affinity for basic dyes.

It is known to copolymerize merely the sulfonate compound with PET to obtain polyester fibers which are dyeable with a basic dye, but no completely satisfactory method has been attained. According to the present invention, PET or PTMT with which a sulfonate compound is copolymerized is used to attain effective utilization of dye sites, to make it possible to stably produce the fibers, to impart to the fibers sufficiently excellent fiber properties and to give the fibers a high dyeability with a simple dyeing procedure at a temperature lower than 100° C at normal pressure. Thus, the present invention can provide basic dye-dyeable polyester fibers having the above characteristics.

When a sulfonate is used in the copolymerization, it should be present in a proportion of not more than 3 mol % per polyethylene terephthalate and in a proportion of not more than 10 mol % per polytetramethylene terephthalate, to ensure that the resulting polymer has the proper melting characteristics.

It is effective for increasing the heat and oxidation resistance of the polymer to add a heat or oxidation resisting additive in an amount of 0.01 to 2.0% by weight of the resultant polymer, to the PET-PTMT polymerization mixture or to the melt mix of PET and PTMT. Suitable such heat and oxidation resisting agents are, for instance, phosphorous esters, such as triphenyl phosphite, tris(p-nonylphenyl)phosphite, trimethyl phosphite, etc. and hindered phenol compounds such as di-tert-butyl-p-cresol, 2,2-methylene-bis(4-methyl-6-tert-butylphenol), 2,2-thio-bis(4-methyl-6-tert-butylphenol), tetrabis[3-(4-hydroxy-3,5-di-tert-butylphenyl)propionyl oxymethyl]methane, 2,6-bis(4-hydroxy-3,5-di-tert-butylphenoxy)-6-octyl-thio-S-triazine, 1,6-hexamethylene-bis($\beta$-4-hydroxy-3,5-di-tert-butylphenylpropion)amide, 4-hydroxy-3,5-di-tert-butylphenylphosphite, 4-hydroxy-3,5-di-tert-butylphenylphosphate, diethyl-4-hydroxy-3,5-di-tert-butylbenzylphosphate.

The polyester comprising at least 95 mol % of ethylene terephthalate used in the present invention can be prepared in accordance with the known methods, e.g., the method disclosed in Japanese Patent Publication No. 8594/56 and the method disclosed in "Polyester Fasern" (Akademie Verlag Berlin 1965).

The polyester comprising at least 85 mol % of tetramethylene terephthalate units can be prepared in accordance with the methods disclosed, for example, in Japanese Patent Publication (OPI which means "open to public inspection") No. 5749/71 and "Journal of Polymer Science" (A-1-4 1851 1966).

The ester interchange reaction between PET and PTMT in the present invention may be carried out by various methods. For example, separately polymerized PET and PTMT are mixed in a kettle, the resultant mixture is extruded to form chips and the chips are melt spun. Another method is to separately mold PET and PTMT into chips and then feed the chips into an extruder. A still further method is to introduce the molten polymers into one mixer and then spin the polymers while carrying out melt mixing and proper ester interchange reaction. A simplified method is to mold PET and PTMT into chips and then feed the chips into one extruder in finely ground form, or as they are, so that the ester interchange reaction is carried out while melt mixing the two components. Thereafter, the mixture is spun. Control of the ester interchange reaction may be accomplished by suitably setting mixing ratio, melting temperature and melt mixing time.

Mixing proportion of PTMT to PET may be 5 to 40%, preferably 15 to 35% by weight in view of the properties of the fibers obtained.

The melt mixing temperature and time may be suitably selected within the ranges of 265° to 300° C and 3 to 120 minutes so that melting point and crystallizing temperature of the filamentary polyester obtained satisfy the formulas (1) and (2) mentioned before. It is generally preferred that when the melt mixing time is long, the temperature is set low and when the mixing ratio of PTMT is high, the melting time is set short and the temperature is set low.

It is preferred in mixing of PET and PTMT to use polymers whose polymerization degrees, and solution viscosity, are suitably selected. For controlling production conditions and ensuring excellent fiber properties, intrinsic viscosities of $[\eta]$ PET and $[\eta]$ PTMT are effectively $0.9 \geq [\eta]$ PET $\geq 0.5$ and $1.5 \geq [\eta]$ PTMT $\geq 0.7$, respectively. Furthermore, regarding the processability at the melt mixing and spinning steps, the intrinsic viscosities of the two polymers will preferably satisfy the following relation: $[\eta]$ PTMT $\geq [\eta]$ PET $+ 0.1$. This is the effective means for attaining homogeneous dispersion and mixing of the two components.

The molten polymers may be made into fibers in accordance with the usual process for producing polyethylene terephthalate fibers, with the exception that in the present invention, the spinning temperature may be lowered to 10° – 15° C lower than the spinning temperature usually employed for spinning conventional polyester fibers. The preferred spinning temperature is within the range of 256° C to 290° C.

The molten polymers may be made into fibers in accordance with the usual process for producing polyethylene terephthalate fibers, with the exception that in the present invention, the spinning temperature may be lowered to 10° – 15° C lower than the spinning temperature usually employed for spinning conventional polyester fibers. The preferred spinning temperature is within the range of 256° C to 290° C.

The fibers of the present invention may be drawn at a temperature which is 10° C – 20° C lower than that for the conventional polyester fibers at a drawing ratio of 2 – 6 times, preferably 2.5 – 4 times to accomplish stable drawing without causing fluff, breakage, or whitening. Thus, fiber properties can be set under the conditions of wider ranges.

To further improve dyeability, the polyester fibers of the present invention may be made into drawn fibers which are low in crystallinity and orientation, by drawing them at a low temperature of lower than 100° C, preferably lower than 85° C, which is lower than the usual drawing temperature.

The thus obtained polyester fibers of the present invention have a high dyeability and moreover, when copolymerized with a sulfonate compound, they have higher dyeability as compared with the known sulfonate-copolymerized polyester fibers and are also excellent in color fastness.

A further significant characteristic of the present invention is that the dyeability is markedly improved while excellent fiber properties are retained. For example, the initial Young's modulus, which is a peculiar characteristic of polyester fibers, is at least 70 g/denier, usually at least 80 g/denier, which is characteristic of fibers having excellent hand woven and knitted fabrics.

Measurements of characteristic values in the present invention were effected as follows:

1. Mechanical characteristics:

Strength, ultimate elongation and initial Young's modulus were measured in accordance with JIS 1070-5.

| | |
|---|---|
| Measuring atmosphere | 20° C, 65% RH |
| Length of sample | 20 cm |
| Extension velocity | 10 cm/min |

The initial Young's modulus was calculated as stress (g/denier) at 100% elongation from gradient of elongation stress curve in the initial elongation area.

2. Measurement of melting point and crystallizing temperature:

Differential Scanning Calorimeter (DSC-1) manufactured by Perkin-Elmer Corporation was used. Amount of sample (filamentary polymer) was about 5 – 10 mg.

Melting point (Tm and $Tm_o$):

This was expressed by peak temperature of endothermic curve appearing at an elevation rate of 10° C/min.

Crystallizing temperature (Tc):

After the polymer was melted, the molten polymer was kept at Tm + 10° C for 5 minutes and thereafter it was cooled at 10° C/min. The crystallizing temperature was expressed by peak crystallization temperature on a exothermic curve which appeared during cooling.

The measurement of the melting point and crystallizing temperature was effected in nitrogen stream.

3. Measurement of intrinsic viscosity $[\eta]$:

Intrinsic viscosity was measured at 25° C with use of a mixed solvent of tetrachloroethylene and phenol (50/50 in weight ratio).

4. Heat resistance:

When the fiber was texturized with changing the false-twisting temperature by a model false twister, the temperature at which incomplete untwisting (impossible to false twist) began was taken as the maximum temperature of heat resistance of the fibers. The test was carried out under the following conditions: texturizing speed .... about 10 m/min; the number of false twists $$\doteq \frac{275000}{D + 60}$$

+ 800 (See Japanese Patent Publication No. 5996/56; D means denier); and length of hot plate .... 30 cm.

5. Heat settability

The lengths lo and l of texturized yarn before and after subjected to boiling water treatment, respectively under load of 0.2 gram/d were measured. The settability was expressed by shrinkage = lo - l/lo × 100 at the boiling water treatment.

The boiling water treatment was carried out under no bond for 20 minutes.

6. Dyeing method and evaluation of dyeability

Unless specifically stated, the dyeing method and measurement of dye exhaustion in the Examples hereinafter given are as follows:

(In case of disperse dye)

A sample was subjected to scouring with an aqueous solution containing 0.5 g/l of mononony phenyl ether of polyoxyethylene at a liquor ratio of 1 : 50 at 70° C for 20 minutes and then was dyed with 5% owf blue disperse dye (CI60767) and 3% owf formalin condensation product of sodium naphthalenesulfonate at a pH of 3 – 4, at a liquor ratio of 1 : 50 at 100° C for 60 minutes. The dye product was washed with water and then soaped with an aqueous solution of 1 g/l of soda ash and 1 g/l of monononylphenyl ether of polyoxyethylene at a liquor ratio of 1 : 50 and at 85° C for 20 minutes.

The dye exhaustion was measured as follows: 100 mg of the dyed yarns or fabric was subjected to dye-extraction with 100 ml of a mixed solution of 49 volume % of N,N'-dimethylformamide, 50 volume % of ethylene glycol and 1 volume % of acetic acid at 150° C. Light absorbances of the extract and dye solution having a known concentration were measured and dye-exhaustion was calculated. (In case of cationic dye)

A sample was scoured in the same manner as in case of the disperse dye and then was dyed with 5% owf blue cationic dye (CI42025) at a pH of 3 – 4, a liquor ratio of 1 : 50, at 100° C for 60 minutes. Then, the dyed sample was washed with water and then was subjected to soaping under the same conditions as in case of the disperse dye.

Dye exhaustion (%) was colorimetrically measured on residual solution by diffraction grating type Spectronic 20 manufactured by Shimazu Seisakusho K.K. (Spectronic 20 is a Trademark).

The following Examples illustrate the invention.

Having generally described the invention, a more complete understanding can be obtained by reference to certain specific examples, which are included for purposes of illustration only and are not intended to be limiting unless otherwise specified.

EXAMPLE 1

This Example is directed to mixing ratio.

Polyethylene terephthalate having [$\eta$] of 0.71 was prepared in accordance with the usual method using manganous acetate and germanium dioxide as a catalyst. To 100 parts of dimethyl terephthalate and 73 parts of ethylene glycol was added 0.03 parts of manganous acetate and ester interchange reaction was allowed to take place with elevation of temperature to 240° C. Then, 0.05 part of triphenylphosphite and 0.03 part of germanium dioxide dissolved in ethylene glycol were added thereto and temperature was elevated to 285° C, at which condensation polymerization was carried out for 2 hours under a reduced pressure of 1 mm Hg. After polymerization reached a given degree, pressure was applied thereto with nitrogen gas and the melt was taken out, cooled in water and molded into chips. On the other hand, to 100 parts of dimethyl terephthalate and 74 parts of 1,4-butanediol was added 0.034 part of hexacetoxydititanoxane and ester interchange was carried out while temperature was gradually elevated to 200° C. Then, the temperature was elevated to 250° C, at which temperature condensation polymerization was carried out under a reduced pressure of 1 – 2 mm Hg for about 2.5 hours to obtain polytetramethylene terephthalate having [$\eta$] of 1.03.

Melting point and crystallizing temperature of polymer chips of polyethylene terephthalate were 260° C and 207° C respectively, and those of polytetramethylene terephthalate were 225° C and 190° C, respectively.

These polymer chips were subjected to drying treatment with vacuum drier at 150° C and while they were mixed in the following weight ratio of polyethylene terephthalate/polytetramethylene terephthalate: (A) 90/10, (B) 80/20, (C) 70/30 and (D) for comparison 57/43, they were fed to extruder and melt mixed at 295° C. The mixture was continuously fed to a spinning head kept at 287° C and output therefrom and taken up to obtain undrawn filaments of 240 d/36 f. Residence time of the mixture in the extruder was about 6 minutes and residence time in the spinning head was about 9 minutes. The melting point and crystallization temperature of filamentary polymers (strand collected without winding) are enumerated in Table 1. The melting point of polymer chips obtained by condensation polymerization of polyethylene/tetramethylene terephthalate copolymer having the same proportions as mixing ratio of the corresponding samples is also shown in Table 1. The melting point of the filamentary polymer gradually decreased with increase in proportion of polytetramethylene terephthalate, but was still higher than that of the corresponding copolymers. This fact indicates that the filamentary polymer compositions in the present invention were not yet finely divided into units by ester interchange reaction and retained as block copolymers of each component having a considerably large (sequence) length.

The undrawn filaments of 234 d/36 f were drawn at draw ratio of 3.3 times with a pin of 85° C and a hot plate of 150° C to obtain drawn filaments of 72 d/36 f.

Dyeabilities, mechanical characteristics (strength, elongation, initial Young's modulus), heat resistant characteristics of the drawn filaments and shrinkage in boiling water of crimped yarns are also shown in Table 1. The polyethylene terephthalate fibers used in the comparative Example are those obtained by melt spinning the polyethylene terephthalate chips prepared in this Example at 287° C to obtain undrawn filaments at 235 d/36 f and drawing the undrawn filaments of drawing ratio of 3.26 times under the same conditions as in this Example. Furthermore, the texturizing temperature was 210° C in case of the comparative polyethylene terephthalate fibers and samples (A) and (B), 200° C in case of sample (C) and 178° C in case of sample (D).

As is clear from these results, samples (A), (B) and (C) according to the present invention had excellent dyeability, fiber properties, heat resistance, and dimension stability while sample (D) which contained polytetramethylene terephthalate in a larger proportion had excellent dyeability, but considerably lower fiber properties, heat resistance and dimension stability.

COMPARATIVE EXAMPLE 1

This comparative Example relates to heat history of the mixed composition.

A mixture of polyethylene terephthalate and polytetramethylene terephthalate used in Example 1 in a weight ratio of 83 : 17 was melt mixed and spun through extruder and spinning head set at 275° C to obtain undrawn filaments of 235 d/36 f. Residence time in the extruder was about 2.5 minutes and that in the spinning head was about 3 minutes. The filamentary polymer which was not taken up had a melting point of 257° C and a crystallizing temperature of 200° C.

The undrawn filaments were drawn in the same manner as in Example 1 to obtain drawn filaments of 72 d/36f. The characteristic values thereof are also shown in Table 1.

The sample (E) of comparative example was good in mechanical properties and heat resistance, but was inferior in dyeability to sample (A). That is, the sample (E) had low effect for increase in dyeability although the mixing ratio was suitable. That is, when the filamentary polymer had the melting point outside the range ($Tm_o-5°$ C $\geq$ Tm $\geq Tm_o-20°$ C) specified in the present invention, the desired excellent dyeability cannot be attained.

characteristics of the samples (F) and (G) are shown in Table 2.

From this Example, it is recognized that sample (G) in which ester interchange reaction proceeded to such extent that melting point and crystallizing temperature were outside the ranges specified in the present invention were extremely deteriorated in both mechanical properties and heat resistance and no longer retained the characteristics as of polyester fibers. On the other hand, sample (F) of the present invention had excellent mechanical properties as well as dyeability.

Table 2

| Sample | Characteristics of filamentary polymer | | Dye exhaustion | Mechanical characteristics | | | Heat resistance |
|---|---|---|---|---|---|---|---|
| | Melting point | Crystallizing temperature | | Strength | Elongation | Young's modulus | |
| F (present invention) | 249° C | 184° C | 78 % | 4.7 g/d | 26 % | 82 g/d | 203° C |
| G (comparative) | 237° C | 176° C | 82 % | 4.0 g/d | 35 % | 70 g/d | 182° C |

Table 1

| Sample | Characteristics of filamentary polymer | | Dye exhaustion (%) | Mechanical characteristics | | | Heat resistance (° C) | Settability (shrinkage in boiling water) (%) | Melting point of copolymer (for reference) (° C) |
|---|---|---|---|---|---|---|---|---|---|
| | Melting point (° C) | Crystallizing temperature (° C) | | Strength (g/d) | Elongation (%) | Young's modulus (g/d) | | | |
| A PET/PTMT = 90/10 | 254 | 202 | 69 | 5.1 | 25 | 95 | 225 | 2.5 | (ET/TMT = 90/10) 240 |
| B PET/PTMT = 80/20 | 251 | 194 | 73 | 5.0 | 28 | 87 | 218 | 2.7 | (ET/TMT = 80/20) 220 |
| C PET/PTMT = 70/30 | 247 | 185 | 75 | 4.8 | 28 | 80 | 205 | 3.2 | (ET/TMT = 70/30) 201 |
| D PET/PTMT = 57/43 | 237 | 174 | 83 | 4.2 | 31 | 64 | 185 | 5.5 | — |
| Polyethylene terephthlate | 260 | 207 | 17 | 5.2 | 25 | 101 | 228 | 2.3 | — |
| E PET/PTMT = 83/17 | 258 | 200 | 42 | 5.1 | 28 | 92 | 220 | 2.5 | — |

PET: Polyethylene terephthalate
PTMT: Polytetramethylene terephthalate

EXAMPLE 2

The same polyethylene terephthalate chips and polytetramethylene terephthalate chips as used in Example 1 were mixed in a weight ratio of 65 : 35 with V type blender. The mixture was dried in vacuo at 130° C for 5 hours and then was melt spun through an extruder at 280° C and at a spinning temperature of 275° C to obtain undrawn filaments, which were drawn under the same conditions as in Example 1 to obtain drawn filaments (F) of 72 d/24 f. Residence time in the extruder and that in the spinning head were 3 minutes and 5 minutes, respectively. On the other hand, mixed chips of the same compositions as above were melt mixed through an extruder at 295° C and spun at a spinning temperature of 290° C. The resultant undrawn filaments were drawn under the same conditions as in Example 1 to obtain drawn filaments (G) of 72 d/24 f. Residence time in the extruder and that in the spinning head were 8 minutes and 12 minutes, respectively. Characteristics of the filamentary polymer and fiber

EXAMPLE 3

Undrawn filaments obtained in Example 1 which corresponded to sample (B) (polytetramethylene terephthalate 20%) were drawn using feed rolls heated to 70° C to obtain drawn filaments of 72 d/36 f without heat set treatment by a hot plate, etc. Thus obtained drawn filaments showed a dye exhaustion of 82% with a disperse dye at 100° C which was higher than that of the corresponding sample (B). Furthermore, they had a strength of 4.5 g/d and a Young's modulus of 82 g/d and thus retained sufficient properties of polyester fibers.

As is clear from the above results, when the fibers of the present invention were drawn at a low temperature, dyeability and fiber properties were further improved.

EXAMPLE 4

After completion of polymerization of polytetramethylene terephthalate in the same manner as in Example 1, 1,6-hexamethylene-bis ($\beta$ . 4-hydroxy-3,5-di-tert-butylphenylpropion)amide and was added in an amount of 0.1% by weight of the polytetramethylene terephthalate into the vessel in nitrogen gas under atmospheric pressure and then they were mixed with agitation at 250° C for 10 minutes. Then, the resultant polymer was taken out. This polymer has a [η] of 1.01. Thirty parts of this polytetramethylene terephthalate and 70 parts of polyethylene terephthalate which had a [η] of 0.71 and which was prepared in accordance with the usual method using calcium acetate, together with antimony trioxide as a catalyst and trimethyl phosphate as a stabilizer were melt mixed and spun using the same spinning machine as in Example 1 at a melt mixing temperature of 290° C and at a spinning temperature of 290° C. Residence time of the mixture in the extruder and spinning head were 5 minutes and 9 minutes respectively. The resultant filaments were drawn at 90° C and heat treatment at 160° C to obtain filaments of 50 d/24 f. Melting point of the filamentary polymer was 245° C and crystallizing temperature was 182° C.

The spinning was continued for 48 hours to cause no troubles. One hundred pirns of drawn filaments in an amount of 1 kg on each pirn were prepared from said undrawn filaments, but substantially no breakage, etc. occurred and the resultant fibers on each pirn had no defects such as fluffs, loops, etc.

For comparison, fibers were produced in the same manner as mentioned above except that polytetramethylene terephthalate to which no 1,6-hexamethylene-bis(β-4-hydroxy-3,5-di-tert-butyl-phenylpropion)amide was added was used. In this case, after a lapse of about 8 hours from the beginning of spinning, black material adhered to the circumference of the spinning holes of surface of a nozzle, due to which kneeling phenomenon which resulted in bending of filamentary polymer extruded occurred and which became more conspicuous with lapse of time. When the thus obtained undrawn filaments were drawn, those which were obtained within a short time from the beginning of spinning showed no difficulties, but those which were obtained after about 8 hours, caused considerable winding at drawing and furthermore those which were obtained after more than about 8 hours showed breakage. The fibers obtained had a great many fluffs and loops. As is clear from this Example, the fibers obtained from a blend polymer containing an antioxidant had excellent spinning stability and drawing stability.

EXAMPLE 5

Example 4 was repeated except that 0.2% by weight of tris(p-nonylphenyl)phosphite was substituted for 1,6-hexamethylene-bis(β . 4-hydroxy-3,5-di-tert-butyl-phenylpropion)amide to obtain substantially the same excellent results as those obtained in Example 4.

EXAMPLE 6

Eighty parts of polyethylene terephthalate which had [η] of 0.71 and which was prepared by the usual method using manganous acetate and germanium dioxide as catalyst and triphenyl phosphite as a stabilizer and 20 parts of polytetramethylene terephthalate having a [η] of 1.03 were melt-mixed at 295° C and spun at 290° C. Residence time in the extruder and that in spinning head were 5 minutes and 9 minutes respectively. The resultant filaments were drawn to 3.3 times at 600 m/min using a pin at 90° C and a hot plate at 160° C to obtain fibers of 50 d/24 f. Melting point and crystallizing temperature of the filamentary polymer were 250° C and 194° C, respectively. In this case, defects were recognized in spinning and drawing stabilities as in Example 4, but these were ignorable. On the other hand, the above procedure of this Example was repeated except that polyethylene terephthalate having a [η] of 0.70 which was prepared in the same manner as above except that triphenyl phosphate was substituted for triphenyl phosphite as a stabilizer was employed. During the spinning, kneeling occurred and winding and breakage considerably occurred at drawing. Thus, the fibers obtained had defects such as fluffs, loops, etc.

As is clear from this Example, in case of practising the present invention with use of polyethylene terephthalate prepared using phosphorous acid triester compound as a stabilizer, the fibers obtained had superior spinning and drawing stabilities than those in case of using polyethylene terephthalate prepared using a phosphoric acid triester compound as a stabilizer.

EXAMPLE 7

A copolymerized polyester having a [η] of 0.55 was obtained by the usual method from 1.7 part of sodium 3,5-di(carbomethoxy)benzene sulfonate (2.2 mol % per dimethyl terephthalate), 49 parts of dimethyl terephthalate, 33.8 parts of ethylene glycol, 0.04 part of sodium methoxide, 0.023 part of manganous acetate and 0.015 part of antimony trioxide. Ninety parts of said polymer and 10 parts of polytetramethylene terephthalate having a [η] of 0.98 were mixed and spun through extruder at 295° C and spinning head at 280° C. Residence time in the extruder and that in spinning head were 6 minutes and 9 minutes respectively. The resultant filaments were drawn at a drawing ratio of 3.3 times at 600 m/min using a pin of 90° C and a hot plate of 150° C to obtain fibers of 150 d/30 f. Melting point of the filamentary polymer was 246° C and crystallizing temperature was 177° C. Said fibers were dyed with 5% owf blue cationic dye (CI42025) at a pH of 3, at 100° C for 60 minutes. Dye exhaustion was 38%. From these results, it was recognized that the fibers of the present invention had excellent dyeability.

EXAMPLE 8

Copolymerized polyethylene terephthalates and polytetramethylene terephthalates with which sodium 3,5-di(carbomethyl)benzene sulfonate was copolymerized as a third component were prepared as shown in Table 3.

TABLE 3

| Polymer No. | Basic component | Amount of SSI per DMT (mol %) | [η] | Melting point (° C) |
|---|---|---|---|---|
| A | PET | 0 | 0.72 | 260 |
| B | PTMT | 0 | 1.02 | 225 |
| C | PET | 2.0 | 0.55 | 252 |
| D | PET | 2.0 | 0.65 | 253 |
| E | PTMT | 6.6 | 0.75 | 203 |

Note:
"SSI" stands for sodium 3,5-di(carbomethoxy)benzene sulfonate "DMT" stands for dimethyl terephthalate. Polymer No. D was prepared by solid polymerization of chips of polymer No. C prepared by melt polymerization, at 210° C for 5 hours in vacuo.

Fibers of 150 d/30 f were produced from mixed polymers No. A,B,C,D and E as shown in Table 4.

Mixing conditions of each polymer were as follows:
Blend polymers were fed to extruder and melt mixed in it at 295° C. The mixtures were fed to the spinning head. Temperature of head were shown in Table 4. Residence time of the mixture in the extruder and that in the spinning head were 6 minutes and 9 minutes respectively.

Spinning conditions for production of fibers were as follows: caliber of nozzle .... 100 mm; Diameter of holes of nozzle .... 0.3 mm; The number of holes ... . 30; Filters .... three 400 mesh stainless steel wire gauze and two 50 mesh stainless steel wire gauze; Extruding amount .... 60 g/min; Take-up speed .... 1000 m/min; Spinning temperature .... as shown in Table 4; Drawing .... with a pin of 90° C and a hot plate of 160° C, 3.3 times, 600 m/min.

Pressure before the filter at spinning, [$\eta$] and strength of the resultant fibers and dye exhaustion when dyed under the same conditions as in Example 1 are shown in Table 4.

minutes. Thereafter, said fabric was sized with a white discharging agent comprising 21% of Maypro gum, 15% of $Zn(OH)(HSO_2)CH_2O$ and 15% of water with use of a printing stand for circular patterns at 130° C for 30 minutes. The fabric was then washed with water and furthermore subjected to reduction soaping with an aqueous solution of 2 g/l of sodium hydroxide, 2 g/l of hydrosulfite and 2 g/l of monononylphenyl ether of polyoxyethylene at a liquor ratio of 1 : 50 at 85° C for 20 minutes to obtain a knitted fabric where only the circular pattern portions were completely discolored into white and the ground was yellow.

On the other hand, a knitted fabric made from the ordinary polyethylene terephthalate texturized yarns was dyed with 3% owf yellow disperse dye (CI26070)

Table 4

| Fibers No. | | Mixing ratio of polymers | Content of SSI in polymer per DMT (mol %) | Spinning temperature (° C) | Pressure before nozzle (kg/cm²) | Melting point of filamentary polymer (° C) | Crystallizing temperature of filamentary polymer (° C) | [$\eta$] | Strength (g/d) | Dye exhaustion (%) |
|---|---|---|---|---|---|---|---|---|---|---|
| I | (Comparative example) | D: 100 % | 2.0 | 300 | 100 | 253 | 183 | 0.55 | 3.8 | 31 |
| II | | D: 90 % B: 10 % | 1.8 | 290 | 92 | 244 | 175 | 0.61 | 4.3 | 67 |
| III | (Comparative example) | C: 100 % | 2.0 | 285 | 85 | 252 | 183 | 0.50 | 3.5 | 35 |
| IV | | A: 70 % E: 30 % | 2.0 | 285 | 84 | 240 | 172 | 0.65 | 4.6 | 72 |

As is clear from Table 4, fibers No. II and IV of the present invention were superior to fibers No. I and III in strength and dyeability.

EXAMPLE 9

This example is for showing that excellent articles can be produced from the fibers of the present invention.

(1) The fibers (sample C) obtained in Example 1 were made into texturized yarns (sample C') with a twist number of 3320 T/M. Said texturized yarns C' and another texturized yarn (T) having 75d/36 f made from ordinary polyethylene terephthalate fibers T were knitted so that interval between stripes were 10 mm, thereby to obtain a stripe knitted fabric. This fabric was scoured with an aqueous solution containing 0.5% of monononylphenyl ether of polyoxyethylene at 70° C and then was dyed with 5% owf blue disperse dye (CI60767) at 100° C for 60 minutes. Furthermore, the fabric was soaped with an aqueous solution containing a small amount of sodium carbonate and monononylphenyl ether of polyoxyethylene at 85° C for 20 minutes at 85° C to obtain a stripe tone knitted fabric in which the portions of yarns C' showed deep blue color and those of yarns T showed very pale blue color.

(2) The fibers (sample C) produced in Example 1 and polyethylene terephthalate fibers of 75 d/36 f were simultaneously texturized at 210° C. with a texturizing machine to obtain texturized yarns of twist number 2280 T/M. The resultant yarns were knitted into a knitted fabric, which was dyed under the same conditions as in the above (1) to obtain a blue knitted fabric having light and shade portions.

(3) The texturized yarns C' obtained in the above (1) were knitted into a knitted fabric, which was dyed with 3% owf yellow disperse dye (CI26090) at 100°C for 60 at 120° C for 60 minutes and then was subjected to white discharge as mentioned above to obtain a fabric in which the circular pattern portions were hardly discolored and the difference in color of the ground part and the circular pattern portions was slight.

EXAMPLE 10

Polyethylene terephthalate copolymers containing 3 mol % and 4 mol % of sodium 3,5-dicarbomethoxy benzene sulfonate as a third component were prepared as shown in Table 5.

TABLE 5

| Polymer No. | Amount of SSI per DMT (mol %) | [$\eta$] | Melting point |
|---|---|---|---|
| F | 3.0 | 0.53 | 247° C |
| G | 4.0 | 0.42 | 243° C |
| H | 4.0 | 0.55 | 243° C |

Intrinsic viscosities of the copolymers obtained on the premise of operation of stable polymerization are 0.53 in the case of 3.0 mol % (F) and 0.42 in the case of 4.0 mol % (G). 15% by weight of the polytetramethylene terephthalate used in Example 8 was mixed therewith and the resulting mixture was melt-spun at an extruder temperature of 295° C and a spinning heat temperature of 290° C. Residence times at the respective parts were about 6 minutes and 9 minutes. The spinning was effected at a winding speed of 1000 m/min by use of a nozzle having a diameter of 0.45 mm and 30 holes. Stretching was conducted in a stretch ratio of 3.3 by use of a pin of 90° C, and a hot plate of 160° C at a speed of 450 m/min to prepare a filament of 150 deniers/30 filaments. Characteristics of these polymers and filaments are shown in Table 6.

TABLE 6

| Filament No. | Mixing ratio of polymers | Melting point | Crystallizing temperature | [η] of filament | Strength of filament | Dyeability | Spinnability and Stretchability |
|---|---|---|---|---|---|---|---|
| V | F: 85% B: 15% | 238° C | 172° C | 0.56 | 4.0 g/d | 83% | stable |
| VI (comparative) | G: 85% B: 15% | 233° C | 170° C | 0.49 | 3.6 g/d | 89% | unstable |
| VII (comparative) | H: 85% B: 15% | — | — | — | — | — | bad |

The pressure at spinning was in an allowable range of 85 to 90 kg/cm² but it was detected that the 4 mol % copolymerized polyesters are inferior in spinning stability such that cutting of filament was somewhat caused in the mix-spinning of the same. Further, naps were much generated in the course of stretching and the resulting product was inferior in commercial value. Said fact is deemed to mainly originate in the shortage of level of polymerization degree of the copolymerized polyester containing 4 mol % of the sulfonate compound. The polymer G was polymerized in a solid phase in the same manner as in Example 7 to elevate to an intrinsic viscosity of 0.55 (the resulting polymer is referred to polymer H) and then the polymer H was tried to be mix-spun with the polymer B in Example 7. However, much cutting of filament is caused in the course of spinning and the filament was unevenly dyed. Said drawback is deemed to originate in difficulty in uniformly mixing the polymer H which has a markedly high melt viscosity with the polymer B which has a low melt viscosity.

From the above results, it is thought that the utilization of a polyethylene terephthalate copolymerized with over 3 mol % of the sulfonate compound should be avoided.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. Polyester fibers having an initial Young's modulus of at least 70 g/d and containing at least one sulfonate component which are characterized by excellent dyeability, which comprise: 60 to 95% by weight of a polyester containing at least 95 mol % of ethylene terephthalate units which contains not more than 3 mol % of a sulfonate compound of the formula

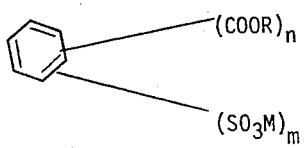

wherein R is selected from the group consisting of hydrogen, lower alkyl and hydroxyloweralkyl, M is an alkali metal, m is 1 or 2 and n is 1, 2 or 3, and which has an intrinsic viscosity $[\eta]$ PET of $0.9 \geq [\eta]$ PET $\geq 0.5$ and 40 to 5% by weight of a polyester containing at least 85 mol % of tetramethylene terephthalate units which contains not more than 10 mol % of said sulfonate compound and which has an intrinsic viscosity $[\eta]$ PTMT of $1.5 \geq [\eta]$ PTMT $\geq 0.7$ and these two viscosities have the relation of $[\eta]$ PTMT $\geq [\eta]$ PET $+ 0.1$, which are melt mixed to cause an ester interchange reaction therebetween at a temperature of 265°–300° C for 3 to 120 minutes, wherein the resulting polyester is characterized by a melting point Tm (° C) of $Tm_0-5(°C) \geq Tm \geq Tm_0-20$ (° C), wherein $Tm_0$ means the melting point of a polyester containing at least 95 mol % of ethylene terephthalate, a crystallizing temperature of at least 170° C, and a sulfonate compound content of at least 1.8% per mol of the terephthalate component of the polyester.

2. The polyester fibers of claim 1 which contain as a heat and oxidation stabilizer, at least one additive selected from the group consisting of triphenyl phosphite, tris(p-nonylphenyl)phosphite, trimethyl phosphite, di-tert-butyl-p-cresol, 2,2-methylene-bis(4-methyl-6-tert-butylphenol), 2,2-thio-bis(4-methyl-6-tert-butylphenyl), tetrabis[3-(4-hydroxy-3,5-di-tert-butylphenyl)-propionyl oxymethyl]methane, 2,6-bis(4-hydroxy-3,5-di-tert-butylphenoxy)-6-octyl-thio-S-triazine, 1,6-hexamethylene-bis(β-4-hydroxy-3,5-di-tert-butylphenyl-propion)amide, 4-hydroxy-3,5-di-tert-butylphenyl-phosphite, 4-hydroxy-3,5-di-tert-butylphenylphosphate, and diethyl-4-hydroxy-3,5-di-tert-butyl-benzyl phosphate.

3. The polyester fibers of claim 1, which are drawn at a drawing temperature of not higher than 100° C.

4. The polyester fibers of claim 1, in which the polymer is obtained by ester interchange reaction of 70 to 85% by weight of polyethylene terephthalate and 35 to 15% by weight of polytetramethylene terephthalate, and the filamentary polymer has a melting point Tm(° C) of $Tm_0-5(°C) \geq Tm \geq Tm_0-15(°C)$ wherein $Tm_0$ is the melting point of the polyethylene terephthalate, and a crystallizing temperature of 185° C or higher.

5. In a method for producing polyester fibers which are characterized by excellent dyeability and mechanical properties, which comprises melt mixing 60–95% by weight of a polyester containing at least 95 mol % of ethylene terephthalate units, and 5–40% by weight of a polyester containing at least 85 mol % of tetramethylene terephthalate, the improvement comprising melt mixing said polyester containing ethylene terephthalate units prepared by copolymerizing polyethylene terephthalate with no more than 3 mol % of a sulfonate compound of the formula

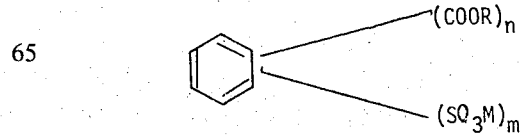

wherein R is hydrogen, lower alkyl or hydroxyloweralkyl, M is an alkali metal, m is 1 or 2 and n is 1, 2 or 3, and said polyester of tetraethylene terephthalate prepared by copolymerizing polytetramethylene terephthalate with no more than 10 mol % of said sulfonate compound to cause an ester interchange reaction between the two polyesters, and thereafter spinning the mixture, wherein said ester interchange reaction is conducted such that the resulting filamentary polymer has a melting point Tm(°C) of $Tm_0-5$ (°C) $\geq$ Tm $\geq$ $Tm_0-20$(°C), wherein $Tm_0$ means the melting point of a polyester containing at least 95 mol % of ethylene terephthalate units, and a crystallizing temperature of at least 170° C and wherein said resulting filamentary polymer is characterized by a sulfonate compound content of at least 1.8% per mol of the terephthalate component of the polyester.

* * * * *